(12) United States Patent
Kwack et al.

(10) Patent No.: US 10,197,818 B2
(45) Date of Patent: Feb. 5, 2019

(54) THERMO-OPTIC OPTICAL SWITCH

(71) Applicant: ELECTRONICS AND TELECOMMUNICATIONS RESEARCH INSTITUTE, Daejeon (KR)

(72) Inventors: Myungjoon Kwack, Gimpo (KR); Jaegyu Park, Daejeon (KR); Jiho Joo, Sejong (KR); Gyungock Kim, Daejeon (KR)

(73) Assignee: ELECTRONICS & TELECOMMUNICATIONS RESEARCH INSTITUTE, Daejeon (KR)

( * ) Notice: Subject to any disclaimer, the term of this patent is extended or adjusted under 35 U.S.C. 154(b) by 12 days.

(21) Appl. No.: 15/678,966

(22) Filed: Aug. 16, 2017

(65) Prior Publication Data
US 2018/0113332 A1 Apr. 26, 2018

(30) Foreign Application Priority Data

Oct. 24, 2016 (KR) .................. 10-2016-0138706
Mar. 7, 2017 (KR) .................. 10-2017-0029146

(51) Int. Cl.
*G02F 1/01* (2006.01)
*G02F 1/00* (2006.01)
*G02F 1/225* (2006.01)

(52) U.S. Cl.
CPC ............ *G02F 1/0147* (2013.01); *G02F 1/009* (2013.01); *G02F 1/2257* (2013.01); *G02F 2201/06* (2013.01); *G02F 2202/022* (2013.01); *G02F 2203/50* (2013.01)

(58) Field of Classification Search
CPC ...... G02F 1/0147; G02F 1/009; G02F 1/2257; G02F 2201/06; G02F 2202/022; G02F 2203/50
See application file for complete search history.

(56) References Cited

U.S. PATENT DOCUMENTS

| 4,146,297 | A | * | 3/1979 | Alferness | ............ | G02F 1/3132 385/132 |
|---|---|---|---|---|---|---|
| 4,492,425 | A | * | 1/1985 | Kersten | ................ | G02F 1/3132 385/27 |
| 5,016,967 | A | * | 5/1991 | Meltz | ................ | G02B 6/02085 385/37 |

(Continued)

FOREIGN PATENT DOCUMENTS

KR   10-2003-0041555 A   5/2003

OTHER PUBLICATIONS

Yunfei Yan et al., "Fast response 2×2 thermo-optic switch with polymer/silica hybrid waveguide", Chinese Optics Letters, Sep. 10, 2012, pp. 092501-1-092501-3, vol. 10, No. 9, Chinese Optics Letters.

*Primary Examiner* — Peter Radkowski

(57) ABSTRACT

Provided is a thermo-optic optical switch including an input waveguide configured to receive an optical signal, an output waveguide configured to output the optical signal, branch waveguides branching from the input waveguide to be connected to the output waveguide, and heater electrodes disposed on the branch waveguides and configured to heat the branch waveguides, wherein the branch waveguides includes first and second phase shifters having first and second thermo-optic coefficients of opposite signs.

10 Claims, 4 Drawing Sheets

(56) References Cited

U.S. PATENT DOCUMENTS

| | | | | |
|---|---|---|---|---|
| 5,159,699 A * | 10/1992 | de Monts | G01N 33/564 | 385/130 |
| 5,559,912 A * | 9/1996 | Agahi | G02B 6/12007 | 385/131 |
| 5,653,008 A * | 8/1997 | Sim | G02F 1/011 | 29/600 |
| 5,732,102 A * | 3/1998 | Bouadma | H01S 5/026 | 372/50.1 |
| 5,857,039 A * | 1/1999 | Bosc | G02B 6/125 | 385/132 |
| 5,970,186 A * | 10/1999 | Kenney | G02F 1/3132 | 385/122 |
| 6,002,823 A * | 12/1999 | Chandross | G02B 6/125 | 385/129 |
| 6,122,416 A * | 9/2000 | Ooba | G02F 1/3132 | 385/131 |
| 6,201,913 B1 * | 3/2001 | Yi | G02B 6/125 | 385/22 |
| 6,215,918 B1 * | 4/2001 | Keil | G02B 6/13 | 385/16 |
| 6,233,378 B1 * | 5/2001 | Sun | G02F 1/3132 | 385/22 |
| 6,240,226 B1 * | 5/2001 | Presby | G02F 1/3136 | 385/145 |
| 6,243,517 B1 * | 6/2001 | Deacon | G02B 6/1228 | 372/102 |
| 6,282,335 B1 * | 8/2001 | Losch | G02B 6/12002 | 385/14 |
| 6,311,004 B1 * | 10/2001 | Kenney | G02B 6/12011 | 385/130 |
| 6,385,383 B1 * | 5/2002 | Marcuse | G02B 6/1221 | 385/140 |
| 6,393,185 B1 * | 5/2002 | Deacon | G02B 6/12004 | 385/12 |
| 6,393,186 B1 * | 5/2002 | Deacon | G02B 6/1228 | 385/16 |
| 6,456,765 B1 * | 9/2002 | Klocek | G02B 6/12004 | 385/42 |
| 6,782,164 B1 * | 8/2004 | Lee | G02B 6/124 | 372/20 |
| 6,810,168 B1 * | 10/2004 | Feng | G02B 6/29353 | 385/15 |
| 6,810,182 B2 * | 10/2004 | Grote | G02F 1/3132 | 385/15 |
| 6,856,734 B1 * | 2/2005 | Presby | G02B 6/1221 | 385/123 |
| 7,167,616 B2 * | 1/2007 | Ling | G02B 6/12007 | 385/37 |
| 7,257,137 B2 * | 8/2007 | Robbins | H01S 5/06256 | 372/20 |
| 8,396,341 B2 * | 3/2013 | Lee | G02B 6/12007 | 385/123 |
| 8,520,985 B2 * | 8/2013 | Park | G02F 1/025 | 385/3 |
| 8,934,741 B2 * | 1/2015 | Chen | G02B 6/12004 | 385/14 |
| 9,291,776 B2 | 3/2016 | Svilans | | |
| 2001/0028769 A1 * | 10/2001 | Deacon | G02B 6/1228 | 385/50 |
| 2002/0018494 A1 * | 2/2002 | Vieira | H01Q 3/2676 | 372/9 |
| 2002/0018507 A1 * | 2/2002 | Deacon | G02B 6/12007 | 372/96 |
| 2002/0076149 A1 * | 6/2002 | Deacon | G02B 6/1228 | 385/27 |
| 2003/0081903 A1 * | 5/2003 | Vahala | G02B 6/126 | 385/50 |
| 2003/0156813 A1 * | 8/2003 | Terakawa | G02B 6/125 | 385/129 |
| 2003/0174950 A1 * | 9/2003 | Akiyama | G02F 1/125 | 385/37 |
| 2003/0214991 A1 * | 11/2003 | Wiedmann | H01S 5/026 | 372/50.12 |
| 2004/0071386 A1 * | 4/2004 | Nunen | G02B 6/12007 | 385/14 |
| 2004/0232521 A1 * | 11/2004 | Colombet | G02B 6/12004 | 257/536 |
| 2004/0240490 A1 * | 12/2004 | Robbins | H01S 5/06256 | 372/20 |
| 2004/0240784 A1 * | 12/2004 | Shih | B82Y 20/00 | 385/31 |
| 2004/0240818 A1 * | 12/2004 | Laskowski | G02B 6/138 | 385/126 |
| 2005/0089291 A1 * | 4/2005 | Yamada | B82Y 20/00 | 385/129 |
| 2006/0039647 A1 * | 2/2006 | Ling | G02B 6/12007 | 385/24 |
| 2006/0171426 A1 * | 8/2006 | Starodoumov | H01S 3/0675 | 372/6 |
| 2007/0058900 A1 * | 3/2007 | Faccio | G02F 1/3132 | 385/37 |
| 2007/0153840 A1 * | 7/2007 | Shevy | H01S 3/067 | 372/6 |
| 2010/0142568 A1 * | 6/2010 | Arimoto | G02F 1/3133 | 372/20 |
| 2011/0103762 A1 * | 5/2011 | Lee | G02B 6/12007 | 385/141 |
| 2011/0150388 A1 * | 6/2011 | Shin | G02B 6/29352 | 385/16 |
| 2012/0027336 A1 * | 2/2012 | Park | G02F 1/025 | 385/3 |
| 2012/0039565 A1 * | 2/2012 | Klein | G02B 6/12007 | 385/14 |
| 2012/0163749 A1 * | 6/2012 | Huang | G02B 6/12004 | 385/3 |
| 2015/0153512 A1 * | 6/2015 | Grote | G02F 1/0147 | 385/42 |

* cited by examiner

THERMO-OPTIC OPTICAL SWITCH

CROSS-REFERENCE TO RELATED APPLICATIONS

This U.S. non-provisional patent application claims priority under 35 U.S.C. § 119 of Korean Patent Application Nos. 10-2016-0138706, filed on Oct. 24, 2016, and 10-2017-0029146, filed on Mar. 7, 2017, the entire contents of which are hereby incorporated by reference.

BACKGROUND

The present disclosure provides an optical switch, and more particularly, to a thermo-optic optical switch.

Typically, a thermo-optic effect may be a phenomenon in which a refractive index of a material changes with a temperature. A typical thermo-optic device may change the phase of light using a thermo-optic effect. A typical optical device may include waveguides using a Mach-Zehnder interferometer (MZI) scheme. For example, the MZI waveguide may modulate and/or switch an optical signal using a single phase shifter.

SUMMARY

An embodiment of the inventive concept provides a thermo-optic optical switch capable of increasing an efficiency of optical modulation and/or optical switching.

An embodiment of the inventive concept provides a thermo-optic optical switch including: an input waveguide configured to receive an optical signal; an output waveguide configured to output the optical signal; branch waveguides branching from the input waveguide to be connected to the output waveguide; and heater electrodes disposed on the branch waveguides and configured to heat the branch waveguides, wherein the branch waveguides include first and second phase shifters having first and second thermo-optic coefficients of opposite signs.

In an embodiment, the first phase shifter may include silicon nitride, and the second phase shifter may include a polymer.

In an embodiment, the silicon nitride may have the first thermo-optic coefficient of $0.4 \times 10^{-4} K^{-1}$ and the polymer may have the second thermo-optic coefficient of $-1.0 \times 10^{-4}$ to $-4.2 \times 10^{-4} K^{-1}$.

In an embodiment, the polymer may include a photoresist or epoxy.

In an embodiment, the branch waveguides may further include: a first optical coupler between the input waveguide and the first and second phase shifters; and a second optical coupler between the output waveguide and the first and second phase shifters.

In an embodiment, each of the first and second optical couplers may include a Y-branch coupler, a multimode interference coupler, a directional coupler, a 3-dB coupler, or a 50:50 coupler.

In an embodiment, the branch couplers may further include at least one mode size converter configured to connect the first and second optical couplers and the second phase shifter in a tapered manner, when the first and second optical couplers have different thicknesses from the second phase shifter.

In an embodiment, the first phase shifter may have a rectangular cross section and the second phase shifter has a square cross section.

In an embodiment, the thermo-optic optical switch may further include a clad between the first and second phase shifters and the heater electrodes, wherein the second phase shifter has a higher refractive index than the clad and has a lower refractive index than the first phase shifter.

In an embodiment, the first phase shifter may have the refractive index of 2.0 and the second phase shifter may have the refractive index of 1.3 to 1.7.

In an embodiment, the thermo-optic optical switch may further include a substrate under the clad, wherein the clad includes: a first clad disposed between the substrate and the first phase shifter; and a second clad separated from the first clad and disposed between the substrate and the second phase shifter.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
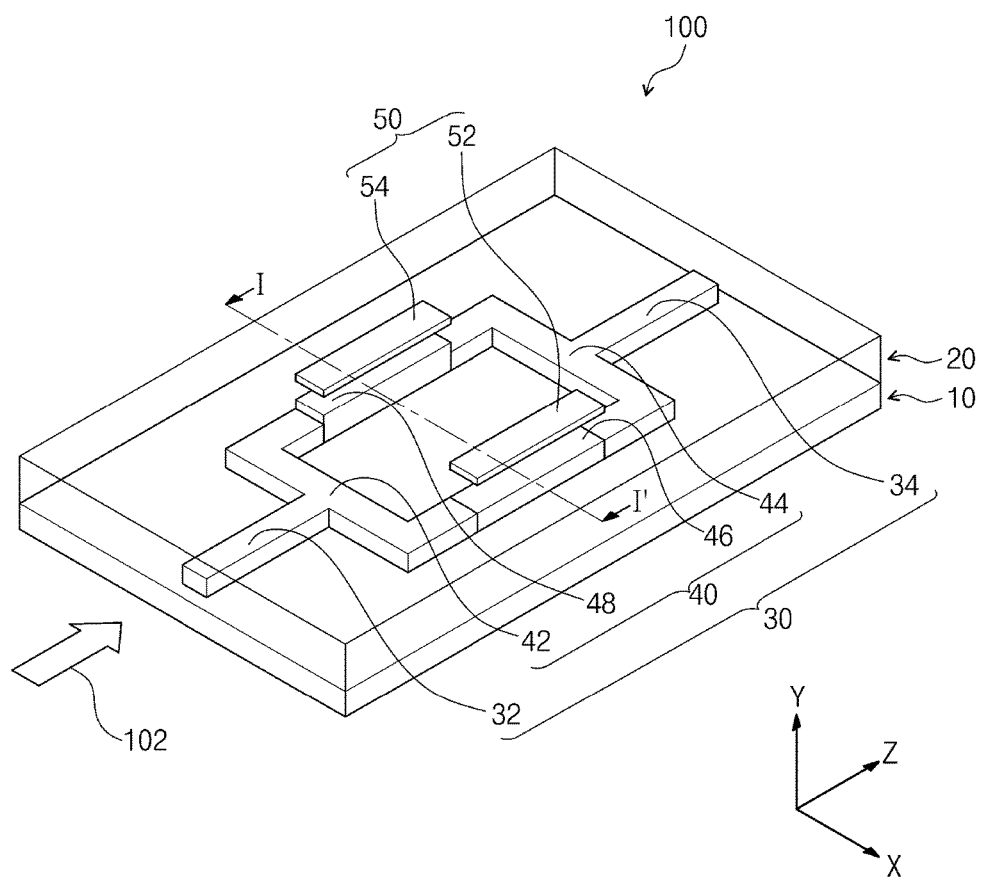
FIG. 1 is a perspective view showing an example of a thermo-optic optical switch according to the embodiment of the inventive concept.

Hereinafter, specific embodiments will be described in detail with reference to the accompanying drawings. Advantages and features of the present invention, and methods for achieving the same will be cleared with reference to exemplary embodiments described later in detail together with the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. The present disclosure is defined by only scopes of the claims. Throughout this specification, like numerals refer to like elements.

The terms and words used in the following description and claims are to describe embodiments but are not limited the inventive concept. As used herein, the singular forms "a," "an" and "the" are intended to include the plural forms as well, unless the context clearly indicates otherwise. It will be further understood that the terms "comprises" and/or "comprising" used herein specify the presence of stated components, operations and/or elements but do not preclude the presence or addition of one or more other components, operations and/or elements. In addition, a solder, blocks, powders, a spacer, and a magnetic field may be understood as mainly used meanings. In addition, as just exemplary embodiments, reference numerals shown according to an order of description are not limited to the order.

FIG. 1 is a perspective view showing an example of a thermo-optic optical switch 100 according to the embodiment of the inventive concept.

Referring to FIG. 1, the thermo-optic optical switch 100 largely includes a substrate 10, a clad 20, waveguides 30 and heater electrodes 50.

The substrate 10 may include a semiconductor substrate. For example, the substrate 10 may include a III-V compound semiconductor substrate, a silicon substrate, or a silicon on insulator (SOI) substrate. The III-V compound semiconductor substrate may include GaAs or InP.

The clad 20 may be disposed on the substrate 10. The clad 20 may have a higher refractive index than the substrate 10. For example, the clad 20 may include silicon oxide ($SiO_2$), silicon oxynitride (SiON), or silicon nitride (SiN).

The waveguides 30 may be disposed in the clad 20. For example, the waveguides 30 may include silicon oxide ($SiO_2$), silicon oxynitride (SiON), or silicon nitride (SiN). In addition, the waveguides 30 may include a photoresist polymer or an epoxy polymer. For example, the waveguides 30 may extend in a Z-direction. The waveguides 30 may have a higher refractive index than the clad 20. Light 102 may propagate along the waveguides 30.

The heater electrodes 50 may be disposed on a part of the waveguides 30 and the clad 20. The heater electrodes 50 may heat a part of the clad 20 and the waveguides 30 using an external current. According to an example, the heater electrodes 50 may include first and second heater electrodes 52 and 54. The first and second heater electrodes 52 and 54 may be parallel with each other. The heater electrodes 50 may include at least one of Au, Cr, Ni, or Ti. For example, the heater electrodes 50 may include TiN.

The refractive indexes of the waveguides 30 and/or the clad 20 may be changed by heat of the heater electrodes 50. The light 102 may be modulated and/or switched according to the changed refractive indexes. The waveguides 30 according to an example may be a thermo-electric switching module using a Mach-Zehnder interferometer (MZI) scheme. Unlike this, the waveguides 30 may be a thermo-optic modulation module using the MZI scheme. For example, the waveguides 30 may include an input waveguide 32, an output waveguide 34 and branch waveguides 40.

The input waveguide 32 may be disposed on one side of the substrate 10. For example, the input waveguide 32 may extend in the Z-direction. The light 102 may be provided to the input waveguide 32 from an optical source (not shown) and/or an optical fiber. The input waveguide 32 may include silicon (Si), silicon oxide ($SiO_2$), silicon oxynitride (SiON), or silicon nitride (SiN).

The output waveguide 34 may be disposed on the other side of the substrate 10. The output waveguide 34 may extend in the same direction as that of the input waveguide 32. The output waveguide 34 may be formed of the same material as that of the input waveguide 32. The output waveguide 34 may include silicon (Si), silicon oxide ($SiO_2$), silicon oxynitride (SiON), or silicon nitride (SiN).

Each of the branch waveguides 40 may branch from the input waveguide 32 to be connected to the output waveguide 34. According to an example, the branch waveguides 40 may include first and second optical couplers 42 and 44, and first and second phase shifters 46 and 48.

Each of the first and second optical couplers 42 and 44 may be connected to the input waveguide 32 and the output waveguide 34. Each of the first and second optical couplers 42 and 44 may include a Y branch coupler, a multimode interference coupler, a directional coupler, a 3 dB coupler, or a 50:50 coupler.

Each of the first and second phase shifters 46 and 48 may connect the first and second optical couplers 42 and 44 to each other. The first and second phase shifters 46 and 48 may be disposed between the substrate 10 and the first and second heater electrodes 52 and 54. The clad 20 may be disposed between the first and second phase shifters 46 and 48, and the first and second heater electrodes 52 and 54.

The first and second heater electrodes 52 and 54 may respectively heat the first and second phase shifters 46 and 48 using an external current. According to an example, the first and second phase shifters 46 and 48 may respectively have first and second thermo-optic coefficients of opposite signs. The first phase shifter 46 may have a higher refractive index than the second phase shifter 48. In other words, the first and second phase shifters 46 and 48 may be formed of different materials. For example, when the first phase shifter 46 is formed of silicon nitride ($Si_3N_4$), the second phase shifter 48 may include a photoresist polymer or an epoxy polymer. The silicon nitride ($Si_3N_4$) may have a thermo-optic coefficient of about $0.4 \times 10^{-4} K^{-1}$. The silicon nitride ($Si_3N_4$) may have a refractive index of about 2.0. The photoresist or epoxy may have a thermo-optic coefficient of about $-1.0 \times 10^{-4}$ to about $-4.2 \times 10^{-4} K^{-1}$. The photoresist or epoxy may have a refractive index of about 1.3 to about 1.7.

Figure 2:
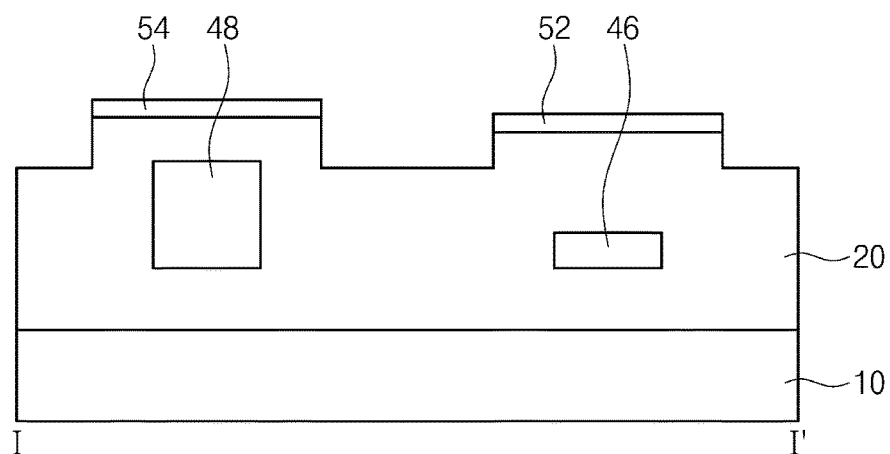
FIG. 2 is a cross section cut and viewed on line I-I' of FIG. 1.

FIG. 2 is a cross section cut and viewed on line I-I' of FIG. 1.

Referring to FIG. 2, the second phase shifter 48 may have the different thickness from the first phase shifter 46. According to an example, the first phase shifter 46 may have a rectangular cross section and the second phase shifter 48 may have a square cross section. For example, when the first and second phase shifters 46 and 48 have an identical width, the second phase shifter 48 may be thicker than the first phase shifter 46.

Referring to FIG. 1 again, the first phase shifter 46 may have the same thickness as the first and second optical couplers 42 and 44. The first and second optical couplers 42 and 44, and the first phase shifter 46 may be formed of the same material. Furthermore, the first and second optical couplers 42 and 44, and the first phase shifter 46 may be formed of the same material as those of the input waveguide 32 and the output waveguide 34.

The second phase shifter 48 may be formed of a material different from those of the first and second optical couplers 42 and 44. The second phase shifter 48 may be thicker than the first and second optical couplers 42 and 44 of FIG. 1. For example, the thick second phase shifter 48 may correct mode miss-match. When the thicknesses of the first and second optical couplers 42 and 44 are identical to that of the second phase shifter 48, a mode size distribution of the light 102 in the first optical coupler 42 may increase. Accordingly, the second phase shifter 48 having greater thickness than the first and second optical couplers 42 and 44 may make the mode size distribution of the light 102 identical.

Figure 3:
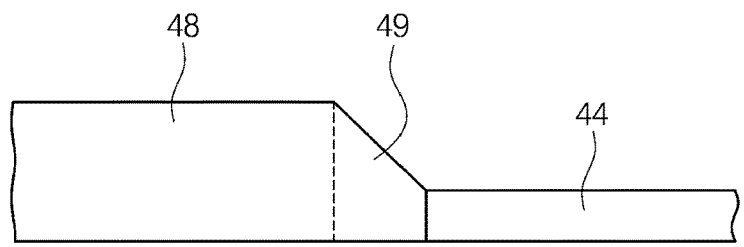
FIG. 3 is a cross-sectional view showing an example of a second phase shifter and a second optical coupler of FIG. 1.

FIG. 3 shows an example of the second phase shifter 48 and the second optical coupler 44 of FIG. 1.

Referring to FIG. 3, the second phase shifter 48 and the second optical coupler 44 may be connected by a mode size converter 49. For example, the mode size converter 49 may adjust the mode size distribution of the light 102 in the second phase shifter 48 and the second optical coupler 44. The mode size converter 49 may include a tapered waveguide. Although not illustrated, the mode size converter 49 may be connected between the first optical coupler 42 and the second phase shifter 48.

Referring to FIG. 1 again, the first and second phase shifters 46 and 48 may change the phase of the light 102 by heat of and/or heating the first and second heater electrodes 52 and 54. For example, the refractive index of the first phase shifter 46 may be changed positively by heating the first heater electrode 52. The first phase shifter 46 may change the phase of the light 102 by $\pi$. The refractive index of the second phase shifter 48 may be changed negatively by heating the first heater electrode 54. The second phase shifter 48 may change the phase of the light 102 by $-\pi$. The first and second phase shifters 46 and 48 may change the phase of the light 102 by $2\pi$. For example, the second optical coupler 44 may provide, to the output waveguide 34, the light 102 of which the phase is modulated and/or changed by $2\pi$.

When the phase of the light 102 is changed by $\pi$ by any one of the first and second phase shifters 46 and 48, the light 102 may be extinct in the second optical coupler 44 or the output waveguide 34. The light 102 of the phase that is not modulated and/or changed by $\pi$ may be output through the output waveguide 34. Accordingly, the thermo-optic optical switch 100 may modulate the light 102 to a data signal.

The first and second phase shifters 46 and 48 may modulate and/or change the phase of the light 102 by $2\pi$ more easily than a typical signal phase shifter. This is because heating margins of the first and second phase shifters 46 and 48 may be higher than that of the typical single phase shifter. Accordingly, the first and second phase shifters 46 and 48 may change the phase of the light 102 more effectively than the typical single phase shifter (not illustrated). Furthermore, the first and second phase shifters 46 and 48, and the first and second heater electrodes 52 and 54 may increase an efficiency of optical modulation and/or optical switching.

Figure 4:
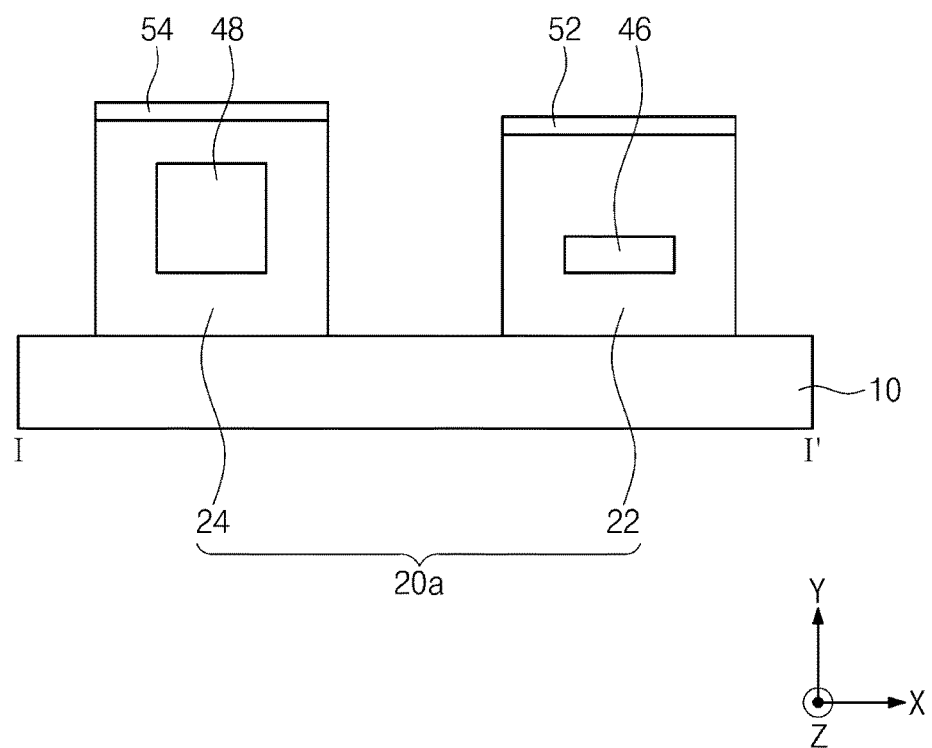
FIG. 4 is a cross-sectional view showing an example of a clad of FIG. 1.

FIG. 4 shows an example of the clad of FIG. 1.

Referring to FIG. 4, the clad 20a may include first and second clads 22 and 24. For example, the first and second clads 22 and 24 may be separated in an X-direction from each other. The separated first and second clads 22 and 24 may thermally separate the first and second phase shifters 46 and 48 from the first and second heater electrodes 52 and 54. The first clad 22 may be disposed between the first heater electrode 52 and the substrate 10. The first phase shifter 46 may be disposed in the first clad 22. The second clad 24 may be disposed between the second heater electrode 54 and the substrate 10. The second phase shifter 48 may be disposed in the second clad 24. An air between the first and second clads 22 and 24 may function as a thermal insulation material.

Figure 5:
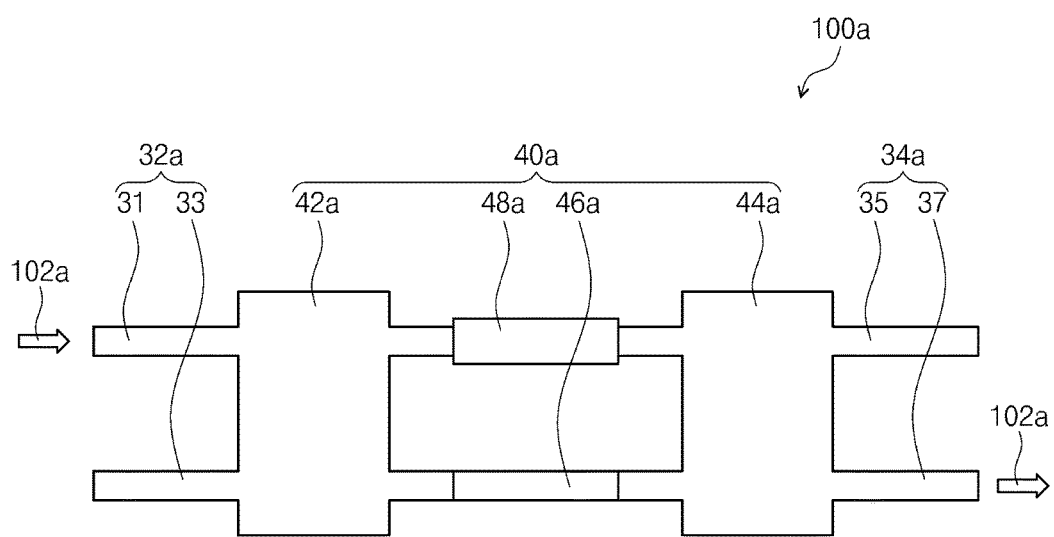
FIG. 5 is a plane view showing an example of the thermo-optic optical switch of FIG. 1.

FIG. 5 shows an example of the thermo-optic optical switch 100 of FIG. 1.

Referring to FIG. 5, an input waveguide 32a may include first and second input waveguides 31 and 33, and an output waveguides 34a may include first and second output waveguides 35 and 37.

The first and second waveguides 31 and 33 may be connected in parallel with a first optical coupler 42a. Light 102a may be provided to first and second phase shifters 46a and 48a through at least one of the first and second input waveguides 31 and 33. The first and second phase shifters 46a and 48a may change a phase of the light 102a to provide the phase-changed light 102a to the second optical coupler 44a.

The first and second output waveguides 35 and 37 may be connected to the second optical coupler 44a. The second optical coupler 44a may selectively provide the light 102a to any one of the first and second output waveguides 35 and 37 according to the phase of the light 102a. For example, when the phase of the light 102a is modulated and/or changed by $2\pi$, the light 102a may be output to the second output waveguide 37. On the contrary, when the phase of the light 102a is not modulated and/or changed, the light 102a may be output to the first output waveguide 35.

Although not illustrated, when being configured in plurality, the thermo-optic optical switch 100a may have N×N channels. Here, N may be a natural number. For example, the numbers of the input waveguides 32a and the output waveguides 34a may be N, respectively.

As described above, a thermo-optic optical switch according to the embodiment of the inventive concept may include first and second phase shifters having first and second thermo-optic coefficients of opposite signs, and heater electrodes on the first and second phase shifters. The first and second phase shifters and the heater electrodes may increase an efficiency of optical switching and/or optical modulation.

The foregoing description is about detailed examples of practicing the inventive concept. The present disclosure includes not only the above-described embodiments but also embodiments that may be simply design-changed or easily modified. In addition, the inventive concept may also include technologies obtained by easily modifying and practicing the above-described embodiments.

Although the exemplary embodiments of the inventive concept have been described, it is understood that the present invention should not be limited to these exemplary embodiments but various changes and modifications can be made by one ordinary skilled in the art within the spirit and scope of the present invention as hereinafter claimed.

What is claimed is:

1. A thermo-optic optical switch comprising:
   a substrate;
   an input waveguide configured to receive an optical signal;
   an output waveguide configured to output the optical signal;
   a branch waveguide comprising first and second branches optically interconnected between the input waveguide and the output waveguide;
   first and second cladding parts disposed over the substrate and separated from one another by a space;
   first and second phase shifters embedded in the first and second cladding parts, respectively, each of the first and second phase shifters being disposed in an optical path of the respective first and second branches; and
   first and second heater electrodes thermally interconnected with the first and second phase shifters, respectively,
   wherein the first and second phase shifters have first and second thermo-optic coefficients of opposite signs.

2. The thermo-optic optical switch of claim 1, wherein the first phase shifter comprises silicon nitride, and
   the second phase shifter comprises a polymer.

3. The thermo-optic optical switch of claim 2, wherein the silicon nitride has the first thermo-optic coefficient of $0.4 \times 10^{-4} K^{-1}$ and the polymer has the second thermo-optic coefficient of $-1.0 \times 10^{-4}$ to $-4.2 \times 10^{-4} K^{-1}$.

4. The thermo-optic optical switch of claim 2, wherein the polymer comprises a photoresist or epoxy.

5. The thermo-optic optical switch of claim 1, wherein the branch waveguide further comprises:

a first optical coupler between the input waveguide and the first and second phase shifters; and
  a second optical coupler between the output waveguide and the first and second phase shifters.

6. The thermo-optic optical switch of claim 5, wherein each of the first and second optical couplers comprises a Y-branch coupler, a multimode interference coupler, a directional coupler, a 3-dB coupler, or a 50:50 coupler.

7. The thermo-optic optical switch of claim 5, wherein the branch couplers further comprise at least one mode size converter configured to connect the first and second optical couplers and the second phase shifter in a tapered manner, when the first and second optical couplers have different thicknesses from the second phase shifter.

8. The thermo-optic optical switch of claim 1, wherein the first phase shifter has a rectangular cross section and the second phase shifter has a square cross section.

9. The thermo-optic optical switch of claim 1,
  wherein the second phase shifter has a higher refractive index than the cladding and has a lower refractive index than the first phase shifter.

10. The thermo-optic optical switch of claim 9, wherein the first phase shifter has the refractive index of 2.0 and the second phase shifter has the refractive index of 1.3 to 1.7.

\* \* \* \* \*